United States Patent [19]

Arai

[11] Patent Number: 4,909,616
[45] Date of Patent: Mar. 20, 1990

[54] OPTICAL SYSTEM FOR RECORDING AND REPRODUCING AN OPTICAL INFORMATION MEDIUM

[75] Inventor: Norikazu Arai, Komae, Japan

[73] Assignee: Konishiroku Photo Industry Co., Inc., Tokyo, Japan

[21] Appl. No.: 302,040

[22] Filed: Jan. 24, 1989

Related U.S. Application Data

[63] Continuation of Ser. No. 51,663, May 18, 1987, abandoned.

[30] Foreign Application Priority Data

May 19, 1986 [JP] Japan ................ 61-112786

[51] Int. Cl.⁴ .............................. G02B 13/08
[52] U.S. Cl. ........................ 350/432; 346/33 A; 355/18
[58] Field of Search ............. 350/432; 346/33 A; 355/18

[56] References Cited

U.S. PATENT DOCUMENTS 4,635,244  1/1987  Gotoh ................ 350/433
4,641,929  2/1987  Braat ................. 350/432

*Primary Examiner*—Bruce Y. Arnold
*Assistant Examiner*—Rebecca D. Gass
*Attorney, Agent, or Firm*—Jordan B. Bierman

[57] ABSTRACT

Generally, in an optical system for recording and reproducing an optical information medium, a semi-conductor laser is used as a light source, an approximately parallel luminous flux is obtained by a collimator lens, and thereafter it is converged on a recording surface by an objective lens. If the semi-conductor laser causes a mode hop to abruptly change an oscillating wavelength, an error results when the objective lens has a chromatic aberration. A collimator lens with a reverse chromatic abberation can be used so that various conventional objective lens may be utilized as they are without any error as described.

10 Claims, 2 Drawing Sheets

OPTICAL SYSTEM FOR RECORDING AND REPRODUCING AN OPTICAL INFORMATION MEDIUM

This application is a continuation of application Ser. No. 051,663, filed 05/18/87, now abandoned.

BACKGROUND OF THE INVENTION

1. Field of the Invention

This invention relates to an optical system for recording and reproducing an optical information medium, and more particularly to an optical system for recording and reproducing an optical information medium, which uses a light source of which oscillating wavelength abruptly changes.

2. Description of the Prior Art

In the recent most general optical system used for an apparatus for recording and reproducing of an optical disk or the like into an optical information recording medium, light issued from a light source 1 is converged on an information recording surface 4 by a collimator or a coupling lens 2 and an objective lens 3 as shown in FIG. 2. The collimator or the coupling lens 2 reduces the divergent light from the light source to a degree of divergence of a parallel light or a level in the proximity thereof, and it is used in the degree of $$|1/mc| < \tfrac{1}{4}$$

where mc represents the image-formation magnification. A convergent lens used in the range as described is herein referred to as a collimater. In this optical system, in the case of a surface deviation of an optical disk or the like, focussing is carried out by moving the objective lens 3 in a direction of an optical axis.

The typical objective lens in a reproducing optical system of a compact disk comprises an aspherical lens whose focal length is 4.5 mm, NAO. 45, and made of an acrylic resin, the aspherical lens being put to practical use. On the other hand, a typical collimator lens has a focal length, 17 mm NAO. 14, and those consisting of one group and two lenses are often used. However, both the objective lens and collimator lens are short in correction of chromatic aberration.

Recently, studies have been made to utilize an optical information medium such as an optical disk as a memory medium of memories for large-type electronic computers and personal computers. In the optical system used for that purpose, a typical objective lens has a focal length, 4.5 mm, NAO. 5. Also, the collimator lens used has a focal length 9 mm, NAO. 3, in the case where the light source is a semiconductor laser. This is because of the necessity of effectively taking-in the quantity of light of the semi-conductor laser for carrying out recording.

Generally, the semi-conductor induces a mode hop due to the external environment such as temperatures, and the oscillating wavelength abruptly changes (approximately in the range of ±10 nm). Therefore, the focussing servo cannot follow, resulting in a recording error and a reproducing error.

In the compact disk reproducing device, error correcting symbols are contained in the recorded signal so that even if the mode hop should occur, the reproduced sound would not be affected. However, in the case of the memory device, such a memory error and a reproduced error increase the bit error rate (BER) to deteriorate the reliability. Therefor, in the memory device, correction of chromatic aberration need be made so that even if the oscillating wavelength abruptly changes, variation of the focal position is fallen in the range that the servo may follow.

In the case of the objective lens having the focal length of 4.5 mm, NAO. 5, it increases its weight by approximately 1 g. On the other hand, in the memory device of the computer, short access time is important but a heavy objective lens impairs the reduction of the access time.

Japanese Patent Application Laid-open No. 3110/1986 has disclosed an objective lens in an attempt of overcoming such a problem as noted above. However, this lens has problems: (1) centering is difficult because it is a junction lens including an aspherical surface; (2) operating distance is short because the total on-the-axis thickness thereof is larger than that of a single lens due to the one group and two-lens structure; (3) it is difficult to freely select the divergence because material of lenses is restricted to secure surface precision as a press glass lens; and (4) it is expensive because aspherical lenses need be joined together in order to secure an image level.

SUMMARY OF THE INVENTION

It is an object of this invention to provide an optical system which involves a correction of chromatic aberration for the entire optical system required to cope with the mode hop while reducing in weight of an objective lens which is movable in a direction of an optical axis.

An optical system for recording and reproducing an optical information medium according to this invention comprises at least a laser light source, a collimator lens having a positive focal length, and an objective lens having a focussing function and further converging a luminous flux from said collimater lens, the divergent light from said light source being converged on an information recording surface, characterized in that said collimator lens has an over-correction chromatic aberration in the neighbourhood of the oscillating wavelength of said laser light source.

The design reference wavelength is 830 nm which is the oscillating wavelength of a general semi-conductor laser, the chromatic aberration is evaluated at 780 nm, and the backfocuses of the respective wavelengths are $f_{b830}$ and $f_{b780}$, respectively. In an aspherical lens designed as an objective lens, the radius of curvature $r_1$ of the apex on the side of the light source is 2.76, the radius of curvature $r_2$ at the apex on the side opposite the light source is $-6.66$, on-the-axis thickness d is 3.1, and the refractive indexes for lights of 830 nm and 780 nm are 1.48491 and 1.48595, respectively. This corresponds to the acrylic resin of which Abbe's number with respect to the line d is 55.

From the calculation formula for the paraxial light, $f_{b830} = 2.8275$ and $f_{b780} = 2.8195$, and the variation of the backfocus per 1 nm wave length change is large, which is 0.16 μm. This state is schematically shown in FIG. 3, in which the solid line is 830 nm and the dotted line is 780 nm light.

When the 830 nm light is incident, as a parallel light, on the objective lens, the 780 nm light is incident as a divergent light, whereby making it possible to decrease a difference in backfocus between both the lights. FIG. 4 shows the case where said difference is 0, and the focussed points of both lights are in coincidence. It is apparent that to this end, a collimator lens of which chromatic aberration is over-correction.

Now, $\delta f_{BO}$ denotes the variation of the backfocus of the objective lens per variation of wavelength 1 nm, and $\delta f_{BT}$ represents the variation of backfocus per variation of wavelength of the entire optical system. And, if $f_o$ and $f_c$ represent the focal lengths of the objective lens and collimator lens, respectively, at a reference wavelength, then the image-formation magnification m of the optical system is expressed by $$m = -f_o/f_c \quad (1)$$

Since the longitudinal magnification of the optical system is expressed by $m^2$ when $f_{BO}$ and $\delta f_{BT}$ are given, the variation $\delta_{BC}$ per variation of wavelength 1 nm of the backfocus of the collimator (the backfocus of the collimator is defined as the backfocus when light is incident from the ejection side of the luminous flux) is expressed by $$\delta f_{BC} = 1/m^2 (\delta f_{BT} - \delta f_{BO}) \quad (2)$$

From the equations (1) and (2), the following equation is obtained:

$$\delta f_{BC} = (f_c/f_o)^2 (\delta f_{BT} - \delta f_{BO}) \quad (3)$$

Assuming now that $f_o = 4.5$ mm, $f_c = 9$ mm, $\delta f_{BT} = 0.05$ μm, and $\delta f_{BO} = 0.16$ μm, the following results, from the equation (3):

$$\delta f_{BC} = -0.44 \ \mu m.$$

Where the objective lens comprises a single lens, which is from a crown glass or an acrylic resin, then, $\delta f_{BO} = 0.12$ to 0.16 μm. While $|\delta f_{BT}| < 0.1$ μm is desired, the following can be employed so as not to make it difficult in designing a collimater lens:

$$0 < \delta f_{BT} < 0.1 \ \mu m$$

With $m = -\frac{1}{2}$ to $-\frac{1}{4}$, the following results, from the equation (2):

$$\delta f_{BC} = -2.52 \text{ to } -0.08 \text{ m}.$$

While the above description has been made of the case of $m_c = \infty$ (wavelength 830 nm), it is noted that the same is applied to the case where the collimater magnification is in the range of $|1/m_c| < \frac{1}{4}$.

DETAILED DESCRIPTION OF THE PREFERRED EMBODIMENTS

Preferred embodiments of this invention will be shown below. Meanings of respective reference symbols are as shown below:

$r_i$: Radius of curvature at apex of the $i^{th}$ lens surface from the light source side $d_i$: Space of the $i^{th}$ lens surface from the light source side $n_i$: Refractive index of the $i^{th}$ lens material from the light source side $v_i$: Abbe number of the $i^{th}$ lens material from the light source side in respect to the line d.

In the orthogonal coordinate system with the apex of the surface being an original and with the direction of optical axis being an X-axis, if C denotes the curvature of apex, K the constant of cone, $A_i$ the coefficient of aspherical surface and $P_i(P_i > 2.0)$, then the shape of aspherical surface is expressed by $$X = \frac{C \phi^2}{1 + \sqrt{1 - (1 + K) C^2 \phi^2}} + \sum_i A_i \phi^{Pi}$$

$$\phi = \sqrt{y^2 + z^2} \quad (C = 1/r)$$

In the tables, the cover glass 1 and cover glass 2 are the cover glass of semi-conductor laser and the cover glass of optical information medium, respectively.

EMBODIMENT

| $f_c = 9.000$ | | $f_o = 4.509$ | $m = -0.501$ | |
|---|---|---|---|---|
| i | | $r_i$ | $d_i$ | $n_i$ | $v_i$ |
| 1 | Cover | ∞ | 0.2500 | 1.50974 | 64.1 |
| 2 | glass 1 | ∞ | 2.0000 | | |
| 3 | | −21.00203 | 1.5000 | 1.76030 | 49.6 |
| 4 | Collimator | −7.07861 | 0.2000 | | |
| 5 | lens | 22.86752 | 1.0000 | 1.78268 | 25.4 |
| 6 | | 4.95156 | 2.8000 | 1.76030 | 49.6 |
| 7 | | −16.85726 | 2.1183 | | |
| 8 | | −11.95837 | 1.0000 | 1.78268 | 25.4 |
| 9 | | 4.95005 | 2.3000 | 1.76030 | 49.6 |
| 10 | | −47.75759 | 10.0000 | | |
| 11 | Objective | 2.76000 | 3.1000 | 1.48491 | 55.0 |
| 12 | lens | −6.66000 | 1.0000 | | |
| 13 | Cover | ∞ | 1.2000 | 1.50974 | 64.1 |
| 14 | glass 2 | ∞ | | | |

| Coefficient of aspherical surface · power number | |
|---|---|
| 11$^{th}$ surface | |
| K = −7.15920 × 10$^{-1}$ | |
| A$_1$ = 1.03550 × 10$^{-3}$ | P$_1$ = 4.0000 |
| A$_2$ = −3.21190 × 10$^{-5}$ | P$_2$ = 6.0000 |
| A$_3$ = −1.43080 × 10$^{-6}$ | P$_3$ = 8.0000 |
| A$_4$ = −4.18760 × 10$^{-7}$ | P$_4$ = 10.0000 |
| 12$^{th}$ surface | |
| K = −2.44400 × 10 | |
| A$_1$ = −8.15810 × 10$^{-4}$ | P$_1$ = 4.0000 |
| A$_2$ = 2.89320 × 10$^{-5}$ | P$_2$ = 6.0000 |
| A$_3$ = −8.65050 × 10$^{-8}$ | P$_3$ = 8.0000 |
| A$_4$ = 5.89290 × 10$^{-8}$ | P$_4$ = 10.0000 |

Figure 1:
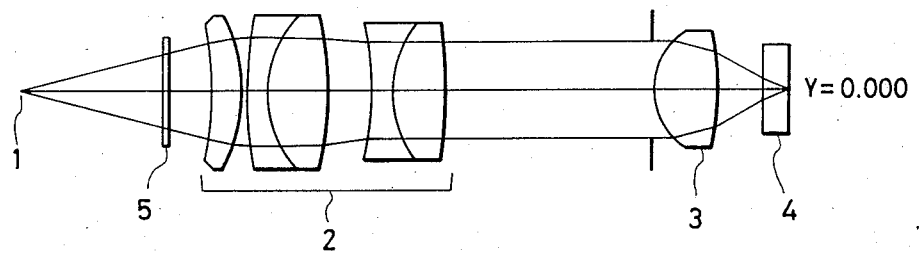
FIG. 1 is a sectional view showing the arrangement of an optical system according to this invention.
Figure 2:
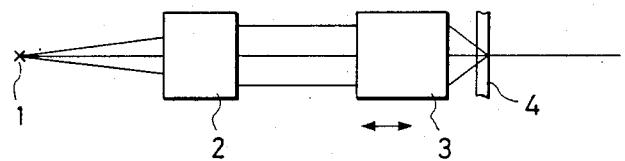
FIG. 2 is a basic arrangement of a conventional example.
Figure 3:
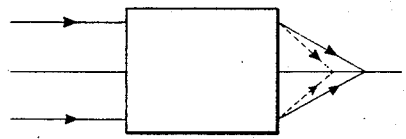
FIGS. 3 and 4 illustrate the phenomena resulting from the mode hop of a semi-conductor.
Figure 4:
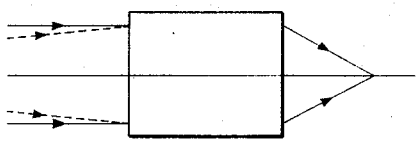
Figure 5:
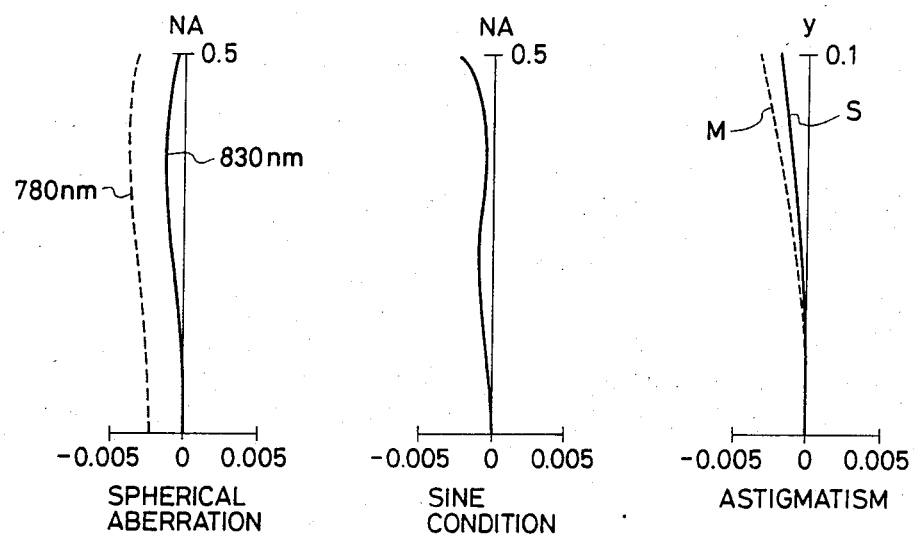
FIGS. 5 and 6 are respectively the aberration curve of the entire optical system and the aberration curve of the objective lens in the examples of this invention.
Figure 6:
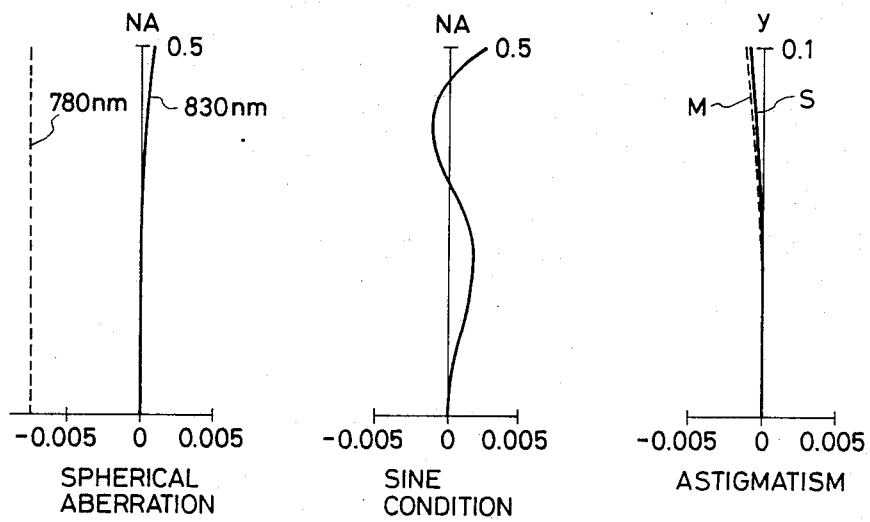

Various aberrations of the entire optical system including the cover glass are shown in FIG. 5, and various aberrations of the objective lens are shown in FIG. 6.

In the above-described embodiment, the objective lens in the optical system according to the present invention comprises a double aspherical lens of which focal length is 4.5 mm, NA0. 5 and formed from an acrylic resin, which has $\delta f_{BO}$ of 0.15 μm whereas in the entire optical system, $\delta f_{BT}$ is 0.044 μm. In the collimator lens, $\delta f_{BC} = -0.42$ μm, which fulfils the equation (3).

As may be seen from the aberrations, the aspherical aberration of the entire optical system is substantially the same as that of the objective lens, and no deterioration of aberration therefor is found.

As described above, even if the optical system of this invention uses, as an objective lens, a single lens made of acrylic resin with chromatic aberration not corrected, it is possible to make correction of aberration required to cope with the mode hop of a semi-conductor in the entire optical system. The objective lens of this kind has its weight of approximately 0.1 g, which is about 1/10 of a glass lens which has been heretofore used for the above-described purpose, and further has its weight of about ⅓ of an objective lens consisting of one group and two lenses using aspherical lenses made of glass.

Furthermore, the manufacturing cost of the objective lens is also about the same as that of aspherical plastic objective lenses for CD which are now being produced in volume inexpensively, and can be produced as the entire system inexpensively as compared with conventional optical systems.

Moreover, recently, hybrid lenses or the like having a thin transparent material having an aspherical shape joined to a heterogeneous lens, a micro-Fresnel lens, and a spherical lens have been used as objective lenses, and those not corrected in chromatic aberration may also used as objective lenses in the optical system according to this invention. In the objective lens composed of two groups and three lenses as disclosed in Japanese Patent Application Laid-open No. 4068/1980 which have been often used, a positive lens may be formed of a material having a small dispersion whereas a negative lens formed of a material having a large dispersion, whereby chromatic aberration to some extent can be made, in which case, the amount of over-correction of chromatic aberration of a collimator lens can be reduced.

What is claimed is:

1. An optical system for recording, reproducing, or recording and reproducing an optical information medium comprising at least a laser light source, a collimator lens having a positive focal length, and an objective lens converging luminous flux from said collimator lens, divergent light from said light source being converged on an information recording surface, characterized in that said collimator lens has a chromatic aberration of over-correction in the neighbourhood of the oscillating wavelength of said laser light source.

2. An optical system as set forth in claim 1, wherein said objective lens comprises a single lens, at least one surface of which is an aspherical surface.

3. An optical system as set forth in claim 2, wherein said objective lens has a focussing function.

4. An optical system as set forth in claim 1, wherein said laser light source comprises a semiconductor laser.

5. In an optical system comprising at least a laser light source, a collimator lens having a positive focal length and an objective lens for further converging luminous flux from said collimator lens, divergent light from said light source being converged on an information recording surface, an optical system for recording, reproducing or recording and reproducing an optical information medium characterized in that said objective lens is constituted by a resin single lens at least one surface of which is an aspherical surface, and said collimator lens has a chromatic aberration of over-correction in the neighbourhood of the oscillating wavelength of said laser light source.

6. An optical system as set forth in claim 5, wherein said laser light source comprises a semiconductor laser.

7. An optical system as set forth in claim 6, wherein said objective lens has a focussing function.

8. A recording and reproducing apparatus for converging light from a laser light source on a recording surface of an information recording medium through a collimator lens and an objective lens to record information on said recording medium or reproduce information on the recording medium, characterized in that the use of said collimator lens is made which has a chromatic aberration of over-correction in the neighbourhood of the oscillating wavelength of said laser light.

9. A recording and reproducing apparatus as set forth in claim 8, wherein said laser light source comprises a semiconductor laser.

10. A recording and reproducing apparatus as set forth in claim 8, wherein said objective lens has a focussing function.

* * * * *